United States Patent [19]

Omiya

[11] Patent Number: 5,077,731
[45] Date of Patent: Dec. 31, 1991

[54] TELECOMMUNICATION ARRANGEMENT

[75] Inventor: Yoshitaka Omiya, Yokohama, Japan

[73] Assignee: Kabushiki Kaisha Toshiba, Kanagawa, Japan

[21] Appl. No.: 447,531

[22] Filed: Dec. 7, 1989

[30] Foreign Application Priority Data

Feb. 9, 1989 [JP] Japan ................................. 1-28578

[51] Int. Cl.$^5$ ................................................ H04J 1/06
[52] U.S. Cl. ................................. 370/30; 370/69.1; 370/32; 455/76
[58] Field of Search ................... 370/69.1, 24, 30, 29, 370/32, 50, 121, 38, 39; 455/76, 86

[56] References Cited

U.S. PATENT DOCUMENTS

| | | | |
|---|---|---|---|
| 3,832,636 | 8/1974 | Kubo | 325/25 |
| 4,231,116 | 10/1980 | Sekiguchi et al. | 370/30 |
| 4,513,447 | 4/1985 | Carson | 455/76 |
| 4,910,793 | 3/1990 | Mainardi | 370/69.1 |

FOREIGN PATENT DOCUMENTS 683942 12/1952 United Kingdom .
811249 4/1959 United Kingdom .

Primary Examiner—Douglas W. Olms
Assistant Examiner—Min Jung
Attorney, Agent, or Firm—Cushman, Darby & Cushman

[57] ABSTRACT

A telecommunication arrangement for transmitting a first communicating signal and receiving a second communicating signal, particularly useful for sattelite communications. A transmitter generates a first transmitting signal at a first time and generates a second transmitting signal at a second time different from the first specified time. The first transmitting signal is mixed with an oscillating signal by a first mixer for producing the first communicating signal. A second mixer mixes the received second communicating signal with an oscillating signal to produce a mixed signal having a frequency corresponding to a function of the frequencies of the second communicating signal and the oscillating signal. In response to the second transmitting signal, the mixed signal is converted into a fixed signal with a constant frequency by a converter. A receiver receives the fixed signal.

19 Claims, 4 Drawing Sheets

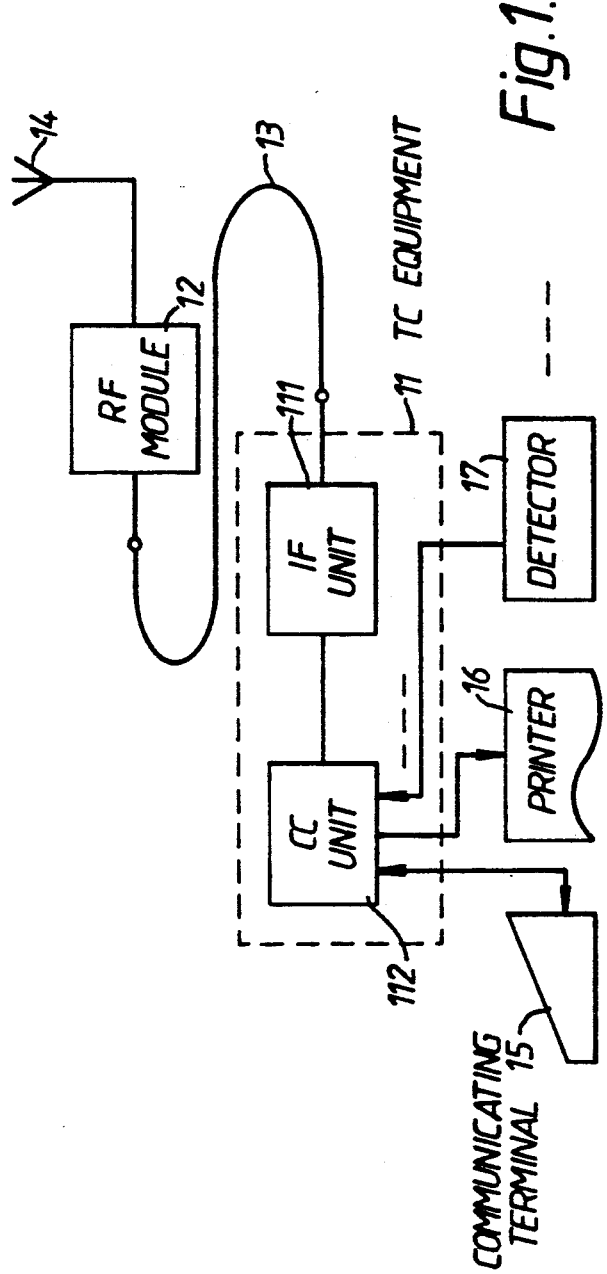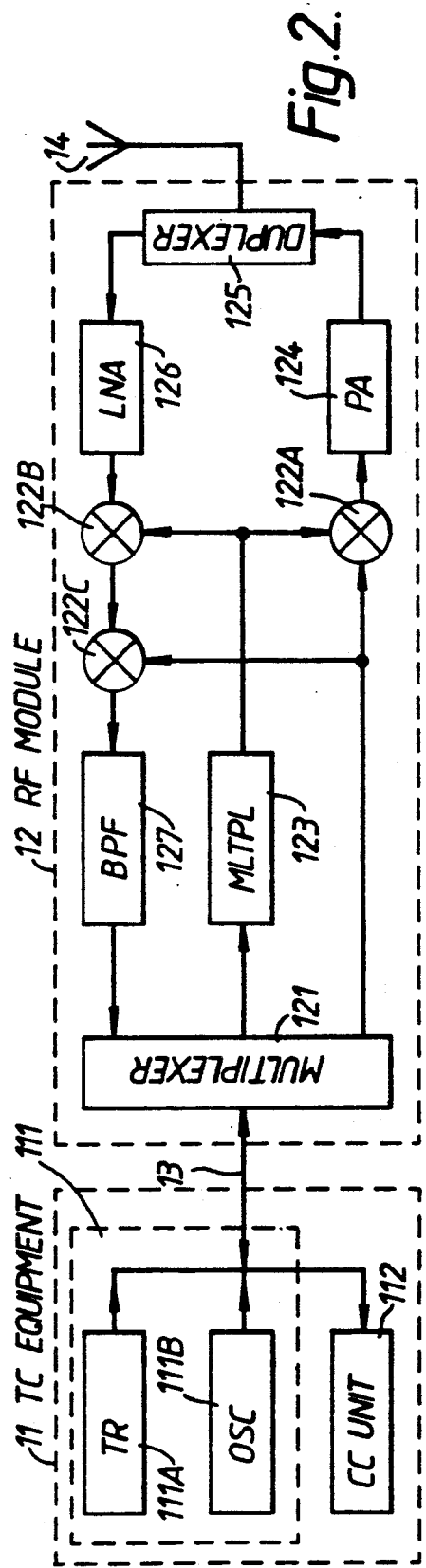

TELECOMMUNICATION ARRANGEMENT

BACKGROUND OF THE INVENTION

1. Field of the Invention

This invention relates in general to telecommunication between earth stations and satellites. The invention is directed to both a telecommunication apparatus and method.

2. Description of the Related Art

It is known to communicate among various earth stations via satellites in orbit around the earth. Various configurations of earth stations allow them to interface with telephone systems, facsimile machines, telex, electronic mail, etc. Generally, such telecommunication arrangements are configured to transmit and receive on multiple channels over a wide band of frequencies.

FIG. 7 (PRIOR ART) shows a known arrangement of an earth station used for telecommunication via a satellite. The apparatus includes a transmitter 901 providing a transmitting signal which is modulated by a modulating signal and an oscillator 902 for generating a constant frequency signal. The transmitting signal is supplied to an up-converter 905 through a coaxial cable 903 and a multiplexer 904. The signal from oscillator 902 is also supplied to a multiplier 906 through coaxial cable 903 and multiplexer 904. A multiplier 906 multiples the frequency of the signal from oscillator 902 to produce a local oscillating signal. An up-converter 905 generates a radio frequency (RF) signal corresponding to the sum of frequencies of the transmitting signal and the local oscillating signal. The RF signal is supplied to a power amplifier 907 for producing and amplified signal to be transmitted from an antenna 909 through a duplexer 908.

Also, antenna 909 receives RF signals from satellites to supply received signals to a low noise amplifier 910 through duplexer 908. A down-converter 911 generates an intermediate frequency (IF) signal corresponding to the difference between both frequencies of the amplified signal from amplifier 910 and the local oscillating signal. The IF signal is supplied to a receiver 912 for demodulating the received signals through multiplexer 904 and coaxial cable 903. A frequency band of transmitted signals from antenna 909 is separated by a defined frequency from a frequency band of the RF signals from satellites.

RF signals are transmitted and received by antenna 909 at different times. Transmitting and receiving can occur on multiple channels simultaneously. Thus, a transmission system for transmitting IF signals to receiver 912 is arranged to have wideband characteristics because the IF signals have various frequencies corresponding to the various communication channels. If the overall power level of the communication arrangement is to remain constant, the power of a signal in one channel cannot rise significantly. Therefore, because power levels of the IF signals are set so as to be relatively low, received signals are easily disturbed by external noise and by internal noise of the apparatus including undesired spurious signals.

It is difficult to frequency multiplex for transmission via a communication cable because the IF signals which are converted by down-converter 911 are distributed over a wide band width.

SUMMARY OF THE INVENTION

It is an object of the present invention to provide a telecommunication arrangement having a higher level received signal than known telecommunication arrangements.

It is a further object of the present invention to produce received signals that are less susceptible to interference by external noise and by internal noises generated within the telecommunication apparatus.

It is still a further object of the present invention to provide a telecommunication arrangement that can more easily frequency multiplex.

To achieve the above objects and in accordance with the purpose of the invention, as embodied and broadly described herein, the invention provides an apparatus for transmitting a first communicating signal having a transmitting frequency and receiving a second communicating signal having a receiving frequency. A transmitter generates a first transmitting signal having a first predetermined frequency at a first predetermined time. The transmitter generates a second transmitting signal having a second predetermined frequency at a second predetermined time different from the first predetermined time. An oscillator generates an oscillating signal having a third predetermined frequency. A first mixer mixes the first transmitting signal and the oscillating signal and produces the first communicating signal. A second mixer mixes the second transmitting signal and the oscillating signal and produces a mixed signal with a converted frequency corresponding to the receiving frequency of the second communicating signal and the third predetermined frequency of the oscillating signal. The mixed signal is converted into a fixed signal, which is received by a receiver, with a constant frequency by a converter.

BRIEF DESCRIPTION OF THE DRAWINGS

The present invention will be explained in detail with reference to accompanying drawings in which:

FIG. 1 is a block diagram of an earth station for satellite communications;

FIG. 2 is a more detailed block diagram of TC equipment and RF module 12 according to one embodiment of this invention;

DETAILED DESCRIPTION OF THE PREFERRED EMBODIMENT

Figure 3:
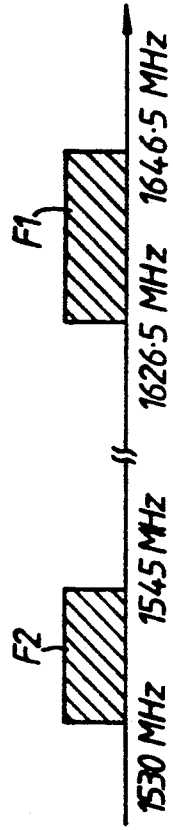
FIG. 3 shows frequency bands for explaining an operation of the apparatus shown in FIG. 2.

A presently preferred embodiment of the invention will be described with reference to the drawings, wherein like or corresponding elements are denoted by the same reference numerals throughout, and detailed descriptions thereof are not repeated.

FIG. 1 is a block diagram configuration of an earth station for satellite communication. The earth station comprises terminal communication (TC) equipment 11 having an intermediate frequency (IF) unit 111 and a communication control (CC) unit 112, and a radio frequency (RF) module 12. IF unit 111 transmits transmitting signals with intermediate frequencies and a reference oscillating signal to RF module 12 through a communication cable 13. RF module 12 produces RF signals as communicating signals to be transmitted from an antenna 14. RF signals as communicating signals from satellites are received by antenna 14 which supply received signals to RF module 12. The received signals are converted into IF signals in RF module 12 to be transmitted to TC equipment 11 through communication cable 13. CC unit 112 includes a signal processor and a central processing unit.

CC unit 112 processes digital data, corresponding to the received signals and transmitting signals, for controlling communications. An operator operates a communicating terminal 15 for communicating through satellites, such as transmitting data from communicating terminal 15 and printing communicating data via a printer 16. A detector 17, which detects such as position data of the earth station, is connected to CC unit 112 to transmit detected data. Also, various devices can be connected to CC unit 112 or extension unit (not shown) in TC equipment 11 to transmit and/or receive data through antenna 14.

FIG. 2 is a more detailed block diagram of TC equipment 11 and RF module 12 according to one embodiment of the invention. IF unit 111 includes a transmitter 111A which has a frequency synthesizer and generates a first transmitting signal having a first predetermined frequency for producing a first communicating signal to be transmitted from antenna 14.

Transmitter 111A also generates a second transmitting signal having a second predetermined frequency when a second communicating signal from a satellite is received. IF unit 111 also includes an oscillator 111B which generates a reference signal having a constant predetermined frequency. The first transmitting signal is modulated by a modulating signal. The first transmitting signal and the reference signal are combined to be transmitted to RF module 12 through communication cable 13 such as one coaxial cable. The first transmitting signal is supplied to a mixer 122A through a multiplexer 121. The reference signal is supplied to a multiplier 123 through multiplexer 121. Multiplier 123 multiples the frequency of the reference signal to produce a local oscillating signal.

Mixer 122A operates as an up-converter to generate a radio frequency (RF) signal corresponding to the sum of frequencies of the transmitting signal and the local oscillating signal. A power amplifier 124 amplifies the RF signal to produce an amplified signal. Antenna 14 transmits the first communicating signal corresponding to the amplified signal from power amplifier 124 through a duplexer 125.

Antenna 14 also receives RF signals as second communicating signals from satellites to supply received signals to a low noise amplifier 126 through duplexer 125. A mixer 122B as a down-converter generates received IF signals corresponding to the difference between both frequencies of amplified signals from amplifier 126 and the local oscillating signal. The received IF signals and the second transmitting signal which is generated in transmitter 111A are supplied to a mixer 122C as a down-converter. Mixer 122C produces a fixed signal having a constant center frequency corresponding to the difference between one of received IF signals and the second transmitting signal. The fixed signal is supplied to CC unit 112 as a receiver for demodulating signals through a band-pass filter 127, multiplexer 121 and communication cable 13.

FIG. 3 shows frequency bands which are used in a standard-C ship earth station in the International Maritime Satellite Organization (INMARSAT). First communicating signals, which are transmitted from antenna 14, are included in a frequency band F1 from 1626.5 MHz to 1646.5 MHz. Second communicating signals, which are received in antenna 14, are included in a frequency band F2 from 1530 MHz to 1545 MHz. Signals can be spaced at 5 KHz in both frequency bands F1 and F2. The frequencies of the first transmitting signals from transmitter 111A are within a frequency band from 154.4 MHz to 174.5 MHz. A signal having one frequency between 154.5 MHz and 174.5 MHz corresponds to one channel of multiple channels.

The frequency of the reference signal from oscillator 111B is set to 92 MHz. If a multiplying number of multiplier 123 is set to 16, the local oscillating signal from multiplier 123 has the frequency of 1472 MHz. Thus, the frequency band of output signals from mixer 122A coincides with frequency band F1. Also, when the second communication signals having frequency band F2 are mixed with the local oscillating signal having the frequency of 1472 MHz in mixer 122B, the received IF signals are included in a frequency band from 58 MHz to 73 MHz.

According to this invention, the frequencies of the second transmitting signals, which are generated in transmitter 111A, are selected so that frequencies of output signals from mixer 122C will become all the same regardless of the frequencies of the received IF signals. The second transmitting signal is tuned to one frequency, within a frequency band from 152 MHz to 167 MHz, corresponding to the received IF signal to be demodulated. The specific signal for communication can be selected by a conversion into the fixed signal with a constant frequency in a narrow band. Therefore it is not necessary for the system transmitting received signals to have broad band characteristics. When a more narrow band characteristic system can be used, noise is more suppressed. Thus, it is possible to obtain received signals having higher signal levels than can be obtained from conventional telecommunication arrangements. Such higher level signals are less susceptible to corruption by undesired spurious signals.

Frequency multiplexing in a communication cable is more easily accomplished in the arrangement according to this invention than in known telecommunication arrangements. Transmitter 111A may generate the first and second transmitting signals which are included in the same frequency band. Therefore, the same frequency band can be available for both transmitting and receiving of communicating signals. This allows TC equipment 11 to be compact and inexpensive.

Figure 4:
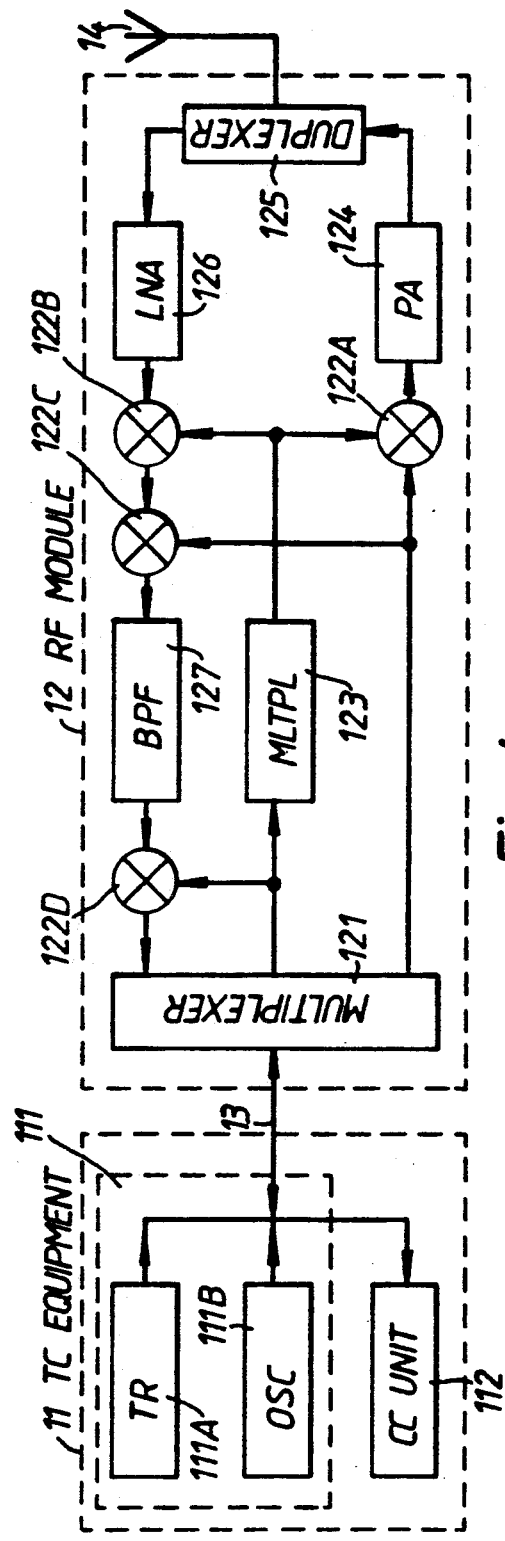
FIG. 4 is a more detailed block diagram of TC equipment and RF module 12 according to a further embodiment of this invention.

FIG. 4 is a block diagram of a another embodiment of the invention. RF module 12 includes a mixer 122D as a down-converter which is connected between band-pass filter 127 and multiplexer 121. Mixer 122D mixes the fixed signal from band-pass filter 127 and the reference signal which is generated in oscillator 111B. Mixer 122D produces a lower fixed signal with its frequency corresponding to the difference between the frequencies of the fixed signal and the reference signal. The frequency of the received IF signals can decreased and separated from the frequency band of the transmitting signals and the reference signal which are generated in IF unit 111. Therefore, frequency multiplexing by communication cable 13 is easily accomplished. In example of frequency values mentioned above, if the frequencies of the second transmitting signals from transmitter 111A are selected so that mixer 122C produces the fixed signal having a frequency of 94.875 MHz, the frequency of the lower fixed signal from mixer 122D becomes 2.875 MHz.

Figure 5:
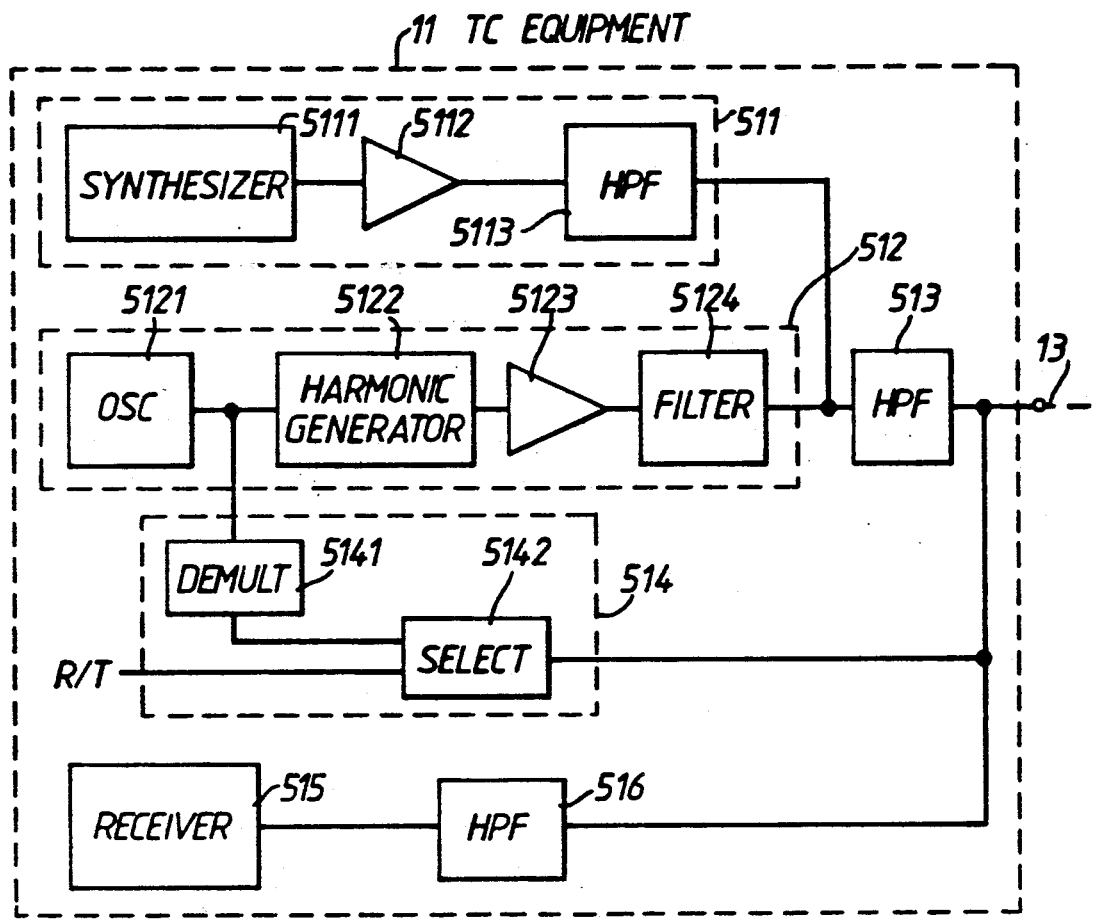
FIG. 5 is a partial block diagram of an apparatus according to still a further embodiment of this invention.
Figure 7:
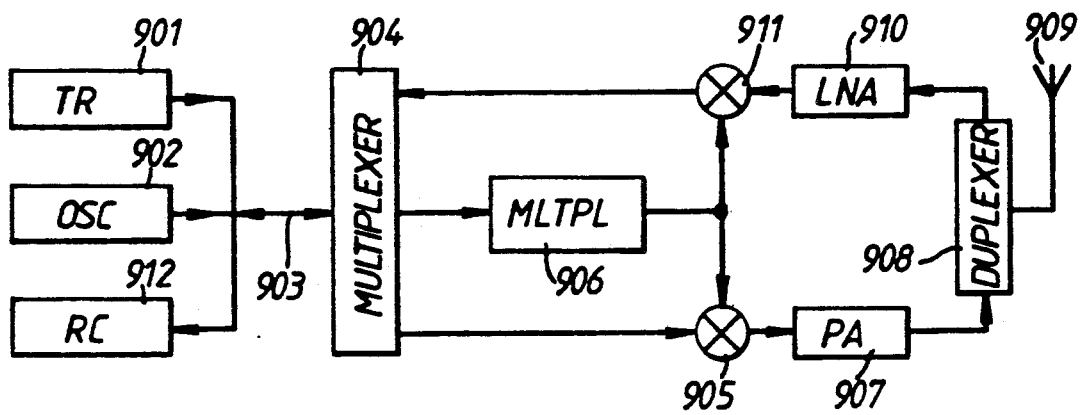
FIG. 7 (PRIOR ART) is a known apparatus used in earth stations for satellite communications.
Figure 6:
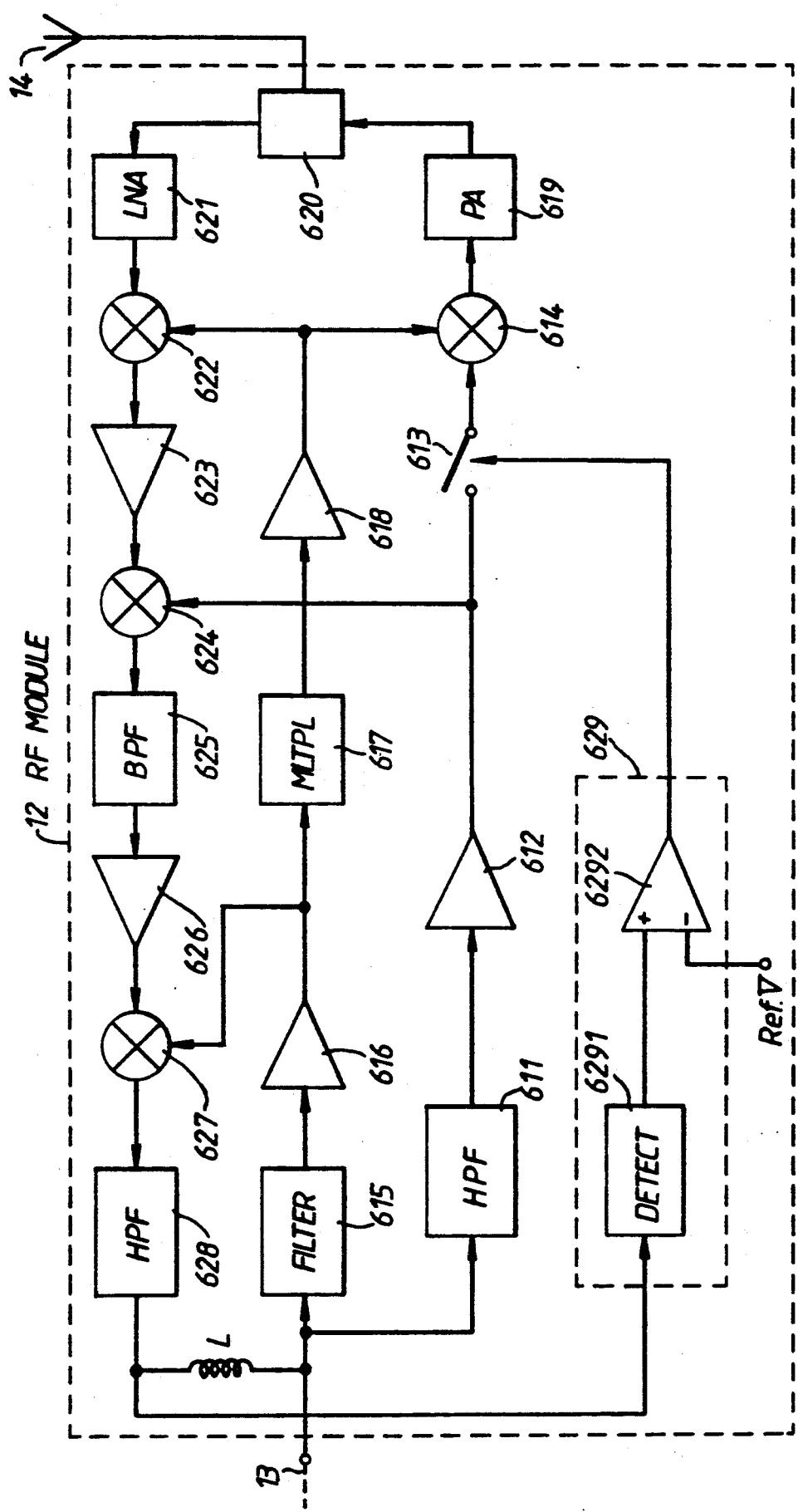
FIG. 6 is another partial block diagram of an apparatus according to still a further embodiment of this invention.

FIGS. 5 and 6 are partial block diagrams of another embodiment of this invention. In this embodiment, means are included for switching transmitting signals from TC equipment in response to a tone detected signal.

As shown in FIG. 5, TC equipment 11 comprises transmitting means 511, oscillating means 512, a tone generator 514 and a receiver 515. Transmitting means 511 includes a synthesizer 5111 which has such as a voltage control oscillator. Synthesizer 5111 generates a first transmitting signal which is modulated by a modulating signal to transmit a first communicating signal to a satellite.

The first transmitting signal has a frequency which is included in a defined frequency band, such as from 154.5 MHz to 174.5 MHz. Synthesizer 5111 also generates a second transmitting signal when a second communicating signal from a satellite is received. A frequency of the second transmitting signal can be in a frequency band similar to that of the first transmitting signal, such as from 152 MHz to 167 MHz.

First and second transmitting signals are transmitted to communication cable 13, such as a coaxial cable, through an amplifier 5112 and high-pass filters 5113 and 513. Oscillating means 512 includes an oscillator 5121 which generates a reference oscillating signal having a constant frequency, such as 11.5 MHz. The reference oscillating signal is multiplied by a harmonic generator 5122 which generates harmonics of the reference oscillating signal. The harmonies are supplied to a filter 5124 through an amplifier 5123. Filter 5124 includes a low-pass filter, for rejecting signals having frequencies more than such as 100 MHz, and a crystal filter which is tuned to eighth harmonic 92 MHz with a high selectivity. An output signal from the crystal filter is supplied to communication cable 13 through a high-pass filter 513.

The reference oscillating signal is also supplied to tone generator 514 which has a low frequency, such as 360 KHz. Selecting circuit 5142 is provided with a transmitter selecting signal and a receiving selecting signal corresponding to transmitting nd receiving of communicating signal. Selecting circuit 5142 supplies the tone signal to communication cable 13 in response to the transmitter selecting signal. The tone signal is not supplied to communication cable 13 if the receiving selecting signal is supplied to selecting circuit 5142. A receiver 515 receives a fixed signal from communication cable 13 through a high-pass filter 516. Receiver 515 corresponds to CC unit 112 shown in FIG. 1.

FIG. 6 is a block diagram of a RF module 12 connected to TC equipment 11 shown in FIG. 5 through communication cable 13. The first and second transmitting signals from communication cable 13 are introduced in switching means 613 which is controlled by a detecting signal from tone detecting means 629.

When synthesizer 5111 in FIG. 5 generates the first transmitting signal, the tone ral from communication cable 13 is supplied to tone detecting means 629, which includes a detector 291 and a comparator 6292, through an inductor L. Detector 6291 detects level of the tone signal. Comparator 6292 compares the level with a reference level. If the level of the tone signal is greater than the reference level, comparator 6292 produces the detecting signal which controls to close switching means 613. Therefore, the first transmitting signal is supplied to a mixer 614.

A filter 615 introduces a signal corresponding to the output signal from oscillating means 512. Filter 612 comprises a crystal filter which generates a signal having the frequency of 92 MHz with a high selectivity. An amplifier 616 amplifies an output signal from filter 615. A multiplier 617 multiplies a frequency, 92 MHz, of an amplified signal by 16 to produce a local oscillating signal having the frequency of 1472 MHz.

The local oscillating signal is supplied to mixers 614 and 622 through an amplifier 618. Mixer 64 produces a first communicating signal having the frequency, corresponding to the sum of the frequencies of the first transmitting signal and the local oscillating signal, which is included between 1626.5 MHz and 1646.5 MHz. The first communicating signal is transmitted by antenna 14 through a power amplifier 619 and a duplexer 620.

When second communicating signals are received in antenna 14, the tone signal is not detected by tone detecting means 629. Thus, switching means 613 is open. The second transmitting signals are supplied to a mixer 624. Received signals from antenna 14 with frequencies between 1530 MHz and 1545 MHz are amplified in a low noise amplifier 621 through duplexer 620. Mixer 622 produces received IF signals, having frequencies between 58 MHz and 73 MHz, which are amplified by an amplifier 623. An mixer 624 produces a fixed signal with a constant frequency corresponding to the difference between the frequencies of the amplified signal and the second transmitting signal.

The frequencies of the second transmitting signals are selected, in accordance with channels, so that the frequencies of the fixed signals will become some predetermined value, such as 94.875 MHz.

A mixer 627 introduces the fixed signal through a band-pass filter 625 and an amplifier 626, and the amplified signal having the frequency of 92 MHz from amplifier 616. Mixer 627 as a down-converter generates a lower fixed signal with its frequency such as 2.875 MHz. The lower fixed signal is supplied to receiver 515 in FIG. 5 through high-pass filters 628 and 516, inductor L and communication cable 13.

According to the present invention, first transmitting signals, which are produced in transmitting means, are used for generating first communicating signals to be transmitted to another stations. When a second communication signals are received at time which is different from transmitting time, second transmitting signals are also produced in transmitting means. The second transmitting signals are used for generating a fixed signal with a constant frequency regardless that received IF signals have various frequencies which are included in a wide frequency band corresponding to multiple channels. This allows a transmitting system of received signals to have minimized narrow-band characteristics for transmission. Therefore, because noise power in the frequency band of the received signals is decreased, output levels of the received signals can be large. Also, frequency multiplexing is easily accomplished. Therefore, it is possible with the present invention to provide an improved communicating apparatus that is suitable for such as multiplex communication.

Although the invention has thus far been described in terms of various apparatus embodiments, the invention also teaches a telecommunication method for transmitting a first communicating signal having a transmitting frequency and receiving a second communicating signal having a receiving frequency. A first transmitting signal having a first predetermined frequency is generated at a first time corresponding to a transmitting time of the first communicating signal. A second transmitting signal having a second predetermined frequency is generated at a second time different from the first time and corresponding to a receiving time of the second communicating signal. An oscillating signal having a third predetermined frequency is generated. The first transmitting signal and the oscillating signal are mixed to produce the first communicating signal. The second communicating signal is mixed with the oscillating signal to produce a mixed signal having a converted frequency corresponding to a function of the receiving frequency and the third predetermined frequency. The mixed signal is converted into a fixed signal having a constant frequency by mixing the mixed signal and the second transmitting signal. The fixed signal with the constant frequency is received.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A telecommunication arrangement for transmitting a first communicating signal having a transmitting frequency and receiving a second communicating signal having a receiving frequency, comprising:
   transmitting means for generating a first transmitting signal having a first predetermined frequency at a first time and for generating a second transmitting signal having a second predetermined frequency at a second time different from the first time;
   oscillating means for generating an oscillating signal having a third predetermined frequency;
   first mixing means for producing the first communicating signal as a function of the first transmitting signal and the oscillating signal;
   second mixing means for mixing the second communicating signal and the oscillating signal to produce a mixed signal having a frequency that is a function of the receiving frequency and the third predetermined frequency;
   converting means, connected to the second mixing means and responsive to the second transmitting signal, for converting the mixed signal into a fixed signal with a constant frequency; and
   receiving means for receiving the fixed signal.

2. A telecommunication arrangement according to claim 1, wherein the transmitting means includes means for modulating the first transmitting signal.

3. A telecommunication arrangement according to claim 1, wherein the oscillating means comprises:
   means for generating a constant frequency reference signal; and
   means for multiplying the reference signal to produce the oscillating signal.

4. A telecommunication arrangement according to claim 1, wherein the transmitting frequency is equal to the sum of frequencies of the first transmitting signal and the oscillating signal.

5. A telecommunication arrangement according to claim 1, wherein the frequency of the mixed signal is equal to the frequency difference between the second communicating signal and the oscillating signal.

6. A telecommunication arrangement according to claim 3, further comprising:
   cable means for transmitting both the first transmitting signal and the reference signal; and
   multiplexing means, connected to the cable means, for supplying the first transmitting signal to the first mixing means and for supplying the reference signal to the multiplying means.

7. A telecommunication arrangement according to claim 1, wherein the first and second transmitting signals are in the same frequency band.

8. A telecommunication arrangement according to claim 3, further comprising third mixing means for producing a converted signal having a frequency corresponding to the frequency difference between the fixed signal and the reference signal, the converted signal being supplied to the receiving means.

9. A telecommunication arrangement according to claim 3, wherein the reference signal generating means comprises:
   an oscillator for producing a reference oscillating signal with a constant frequency;
   a generator connected to the oscillator for generating harmonics of the reference oscillating signal; and
   means for selecting the reference signal from the harmonics.

10. A telecommunication arrangement according to claim 1, further comprising:
    means for generating a tone signal when the first communicating signal is transmitted;
    means for detecting the generated tone signal to produce a detected signal; and
    means, responsive to the detected signal, for supplying the first transmitting signal to the first mixing means.

11. A telecommunication arrangement according to claim 3, further comprising:
    means for demultiplying the reference signal from the reference signal generating means to produce a tone signal;
    selecting means for producing an output signal corresponding to the tone signal at a transmitting time of the first communicating signal;
    detecting means for detecting the output signal from the selecting means to produce a detected signal;
    means for comparing a level of the detected signal with a reference level to produce a compared signal when the level of the detected signal is greater than the reference level; and
    means, responsive to the compared signal, for supplying the first transmitting signal to the first mixing means.

12. A telecommunication method for transmitting a first communicating signal having a transmitting frequency and receiving a second communicating signal having a receiving frequency, comprising the steps of:
    generating a first transmitting signal having a first predetermined frequency at a first time corresponding to a transmitting time of the first communicating signal;

generating a second transmitting signal having a second predetermined frequency at a second time different from the first time and corresponding to a receiving time of the second communicating signal;

generating an oscillating signal having a third predetermined frequency;

mixing the first transmitting signal and the oscillating signal to produce the first communicating signal;

mixing the second communicating signal and the oscillating signal to produce a mixed signal having a converted frequency corresponding to a function of the receiving frequency and the third predetermined frequency;

converting the mixed signal having the converted frequency into a fixed signal having a constant frequency by mixing of the mixed signal and the second transmitting signal; and receiving the fixed signal with the constant frequency.

13. A method according to claim 12, wherein the step of generating the first transmitting signal includes the step of modulating the first transmitting signal.

14. A method according to claim 12, wherein the step of generating the oscillating signal includes the steps of:

generating a reference signal having a constant frequency; and multiplying the reference signal to produce the oscillating signal by multiplying means.

15. A method according to claim 12, wherein the step of mixing the first transmitting signal and the oscillating signal includes the step of generating a signal which has the transmitting frequency corresponding to the sum of frequencies of the first transmitting signal and the oscillating signal.

16. A method according to claim 12, wherein the step of mixing the second communicating signal and the oscillating signal includes the step of generating the mixed signal having the frequency corresponding to the frequency difference between the second communicating signal and the oscillating signal.

17. A method according to claim 14, further comprising the steps of:

combining the first transmitting signal and the reference signal to produce a combined signal;

transmitting the combined signal;

dividing the combined signal into the first transmitting signal and the reference signal;

supplying the first transmitting signal to the first mixing means; and supplying the reference signal to the multiplying means.

18. A method according to claim 14, further comprising the step of producing a converted signal with a frequency corresponding to the frequency difference between the fixed signal and the reference signal.

19. A method according to claim 12, further comprising the steps of:

generating a tone signal at a transmitting time of the first communicating signal;

detecting a generated tone signal; and supplying the first transmitting signal to the first mixing means when the generated tone signal is detected.

* * * * *